United States Patent
Dembovskis et al.

(10) Patent No.: US 9,252,871 B2
(45) Date of Patent: Feb. 2, 2016

(54) AIS-SCHIFFSTRANSCEIVER

(71) Applicant: Deutsches Zentrum fuer Luft- und Raumfahrt e.V., Cologne (DE)

(72) Inventors: Andis Dembovskis, Bremen (DE); Joerg Behrens, Bremen (DE)

(73) Assignee: Deutsches Zentrum für Luft- und Raumfahrt e.V., Köln (DE)

(*) Notice: Subject to any disclaimer, the term of this patent is extended or adjusted under 35 U.S.C. 154(b) by 165 days.

(21) Appl. No.: 14/071,752

(22) Filed: Nov. 5, 2013

(65) Prior Publication Data
US 2014/0127990 A1    May 8, 2014

(30) Foreign Application Priority Data
Nov. 5, 2012    (DE) .................. 10 2012 110 541

(51) Int. Cl.
| | |
|---|---|
| *H04B 7/24* | (2006.01) |
| *H04B 7/26* | (2006.01) |
| *H04W 12/12* | (2009.01) |
| *G08G 3/02* | (2006.01) |
| *H04W 4/04* | (2009.01) |
| *H04W 12/10* | (2009.01) |
| *H04L 29/08* | (2006.01) |

(52) U.S. Cl.
CPC .. *H04B 7/26* (2013.01); *G08G 3/02* (2013.01); *H04W 4/046* (2013.01); *H04W 12/12* (2013.01); *H04L 67/12* (2013.01); *H04W 12/10* (2013.01)

(58) Field of Classification Search
CPC ........ G01S 13/9307; G08G 3/00; G08G 3/02; H04B 7/18513
USPC ......... 455/3.02, 427, 12.1, 456.1, 39; 701/21, 701/301, 517; 342/41; 340/984
See application file for complete search history.

(56) References Cited

U.S. PATENT DOCUMENTS

| | | | |
|---|---|---|---|
| 7,809,370 B2* | 10/2010 | Stolte et al. .................... 455/427 |
| 7,889,100 B2* | 2/2011 | Miller ........................... 340/984 |
| 8,838,985 B1* | 9/2014 | Robbins ........................ 713/182 |
| 2008/0086267 A1 | 4/2008 | Stolte et al. |
| 2010/0056181 A1* | 3/2010 | Rippon et al. ............. 455/456.3 |
| 2011/0051555 A1 | 3/2011 | Mitchell et al. |
| 2011/0304502 A1* | 12/2011 | Chen et al. .................... 342/352 |
| 2013/0058271 A1* | 3/2013 | De Latour et al. ............ 370/315 |

FOREIGN PATENT DOCUMENTS

| | | |
|---|---|---|
| DE | 10 2011 113 152 | 3/2013 |
| EP | 2003818 A1 | 12/2008 |
| GB | 2482123 | 1/2012 |
| WO | 2011/121294 | 10/2011 |

OTHER PUBLICATIONS

"Technical characteristics for an automatic identification system using time-division multiple access in the VHF maritime mobile band"; International Telecommunication Union, ITU-R, Recommendation ITU-R M.1371-4, Apr. 2010, pp. 103-104.

* cited by examiner

*Primary Examiner* — Sonny Trinh
(74) *Attorney, Agent, or Firm* — Whitham, Curtis, Christofferson & Cook, P.C.

(57) ABSTRACT

The invention relates to an AIS ship transceiver which, after reception of an AIS base station message, validates the transmitting AIS base station and activates or deactivates the emitting of AIS radio signals in dependence on the validation.

10 Claims, 1 Drawing Sheet

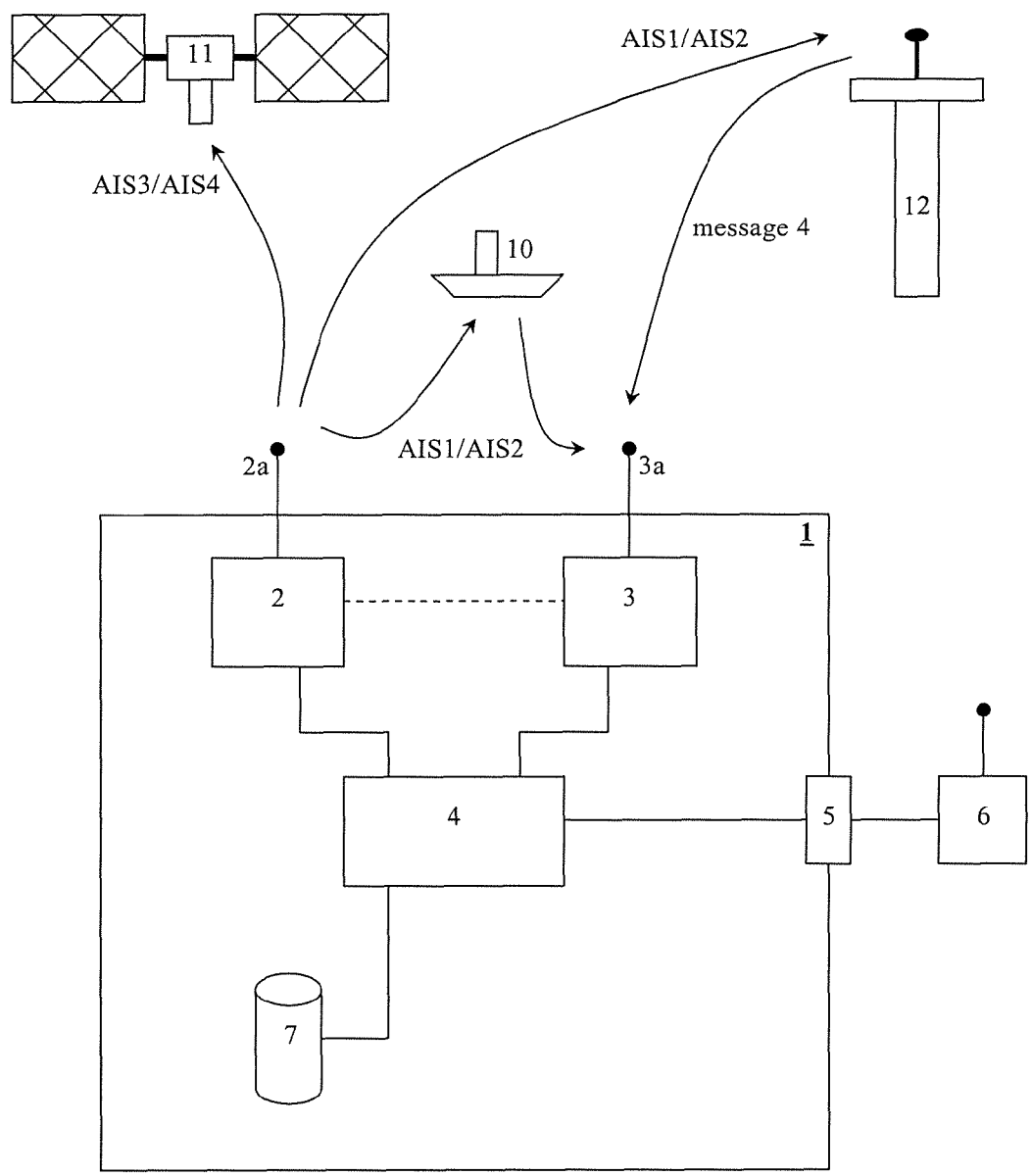

AIS-SCHIFFSTRANSCEIVER

FIELD OF THE INVENTION

The invention relates to an AIS ship transceiver which is provided for installation in a ship in order to be able to transmit and receive AIS radio signals, comprising an AIS radio transmitting unit, which is designed for transmitting AIS radio signals, and comprising an AIS radio receiving unit which is designed for receiving AIS radio signals which have been emitted by adjacent ships and/or AIS base stations, located within range, the AIS ship transceiver being configured to deactivate and/or to activate the emitting of at least a part of the AIS radio signals by the AIS radio transmitting unit after reception of an AIS base station message emitted by an AIS base station, in dependence on the received AIS base station message.

The invention also relates to a method for transmitting and receiving AIS radio signals by such an AIS ship transceiver for this purpose.

BACKGROUND

Monitoring the ship traffic increasing throughout the world is based today predominantly on radar monitoring, voice radio and the utilization of AIS (Automatic Identification System). Since the year 2000, the AIS has been specified as obligatory standard by the International Maritime Organization (IMO) in order to increase the safety of international ship traffic. This locally limited radio system is used for exchanging navigations and other ship data which are intended to enable the ships to obtain a comprehensive overview of the adjacent ship traffic. The primary aim in this context is to avoid collision between ships.

With the aid of an AIS ship transceiver arranged on the ships, AIS radio signals which the corresponding ship data such as, for example, navigation data, are emitted in a broadcast process alternately on two channels in the FM maritime radio band, namely on 161.975 MHz on the one hand, and on 162.025 MHz, on the other hand. Emitting the individual AIS radio signals in this case occurs at fixed time intervals, the occupancy of which is tuned independently by the relevant subscribers of AIS radio cell, so-called SOTDMA (Self Organizing Time Division Multiple Access). Thus, only 2,250 time slots are available per minute to the individual subscribers for a transmission of data.

With the aid of the AIS ship transceiver installed on board, the radio signals emitted by the other ships can be received, wherein the ship data contained in the AIS radio signals can then be extracted. By means of the reception of the ship data of different ships in the environment of a ship, an overview of the adjacent ship traffic or of the adjacent ships can thus be derived so that a ship can find out, for example, in what direction and with what speed adjacent ships are traveling which, for example, are not directly visible due to poor sight conditions. This makes it possible therefore to avoid collisions and to generate a significantly improved, even if locally limited, situational overview.

Due to the FM frequency band used, the radio range of AIS from ship to ship corresponds to approximately 40 to 60 km, which corresponds to slightly more than the normal visual range on the high sea. Due to their higher positions, coast stations can cover a circle of up to 100 km. Due to the limited range and the SOTDMA transmission protocol used, ships which can see and receive one another form an AIS radio cell within which the subscribers can transmit and receive without collision.

The AIS thus only represents a local radio system which, although it provides sufficient time slot capacity for a ship on the high sea, is not suitable however for a worldwide, especially satellite-based survey of the ship traffic since the coverage of a satellite comprises many individual AIS radio cells. However, a real-time survey of the AIS ship traffic data occurring worldwide would be of great interest to shipping companies, the maritime organizations or environmental ministries, especially in order also to counteract illegal machinations on the high sea.

Thus, a global ship monitoring system for example is known from the post-published DE 10 2011 113 152 A1 by means of which ships of ship traffic on the high sea can be monitored centrally. For this purpose, commercial aircraft have AIS receiving units which receive the AIS radio signals emitted by the ships along their flight route and transmit them for further processing to a base station. By this means, an almost gapless coverage and monitoring can be achieved especially on much-traveled routes.

In the recent past, trials have been undertaken to arrange AIS receiving antennas on satellites in order to be able to receive the AIS radio signals emitted worldwide with the aid of a satellite system. Thus, a satellite-based system is known, for example, from US 2008/0086267 A1 in which an AIS receiving unit is arranged at the satellites in order to be able to receive the AIS radio signals emitted by the ships. The AIS information contained in the AIS radio signals is forwarded to a central station in order thus to obtain global monitoring of the ship traffic. By means of such a satellite system, gapless monitoring thus can also be achieved in remote regions.

The Western industrial nations, in particular, demand the introduction of control of the marine traffic from space as part of their anti-terror campaign. With regard to AIS radio signals in highly frequented maritime regions, however, such satellite-based monitoring systems have the considerable disadvantage that the detection of ships can no longer be implemented with sufficient accuracy. Due to the extreme altitude of a satellite, an area of reception having a diameter of approx. 5000 to 6000 km is covered. Since the AIS as a local radio system organizes itself independently into individual radio cells, all of which transmit on the same frequency band, such a large radius of reception however leads to the reception of a multiplicity of radio cells having identical transmitting frequency and time slots so that AIS radio signals of different AIS radio cells become superimposed and normal data processing is no longer possible. It is especially on highly frequented shipping routes or in the vicinity of harbors and coasts that the area of reception of the satellite covers such a large number of ships that sufficiently reliable monitoring is no longer possible due to the signal collisions.

To counter this problem, two additional FM channels are provided from now on for satellite-based monitoring with the aid of AIS radio signals, in addition to the AIS frequencies already existing (AIS1: 161.975 MHz; AIS2: 162.025 MHz). For this purpose, for the communication, the channels 156.775 MHz (AIS3) and 156.875 (AIS4) are to be allocated especially for the reception of AIS radio signals from space by satellite. The background to introducing the additional satellite AIS (SAT-AIS) frequencies is to obtain as complete as possible a maritime situational overview with the aid of SAT-AIS on the high sea away from the coastal regions. However, it is not currently possible with AIS1 and AIS2 for the above-mentioned reasons (interferences).

According to the ITU definition (ITU-R-M-1371-4), AIS3 and AIS4 radio signals are switched off automatically at the ship when the ships are within the communication range of so-called AIS base stations which generally are installed at the coast. If a ship receives a "base station report" (message 4), sent out by an AIS base station with the demand to switch off SAT-AIS (control bit for "transmission control for long range broadcast message"), the AIS ship transceiver installed on the ship deactivates the emission of the AIS3/AIS4 radio signals for the satellite-based monitoring. This is intended to achieve in coastal regions which, as a rule, are highly traveled due to the concentration of ship traffic, no AIS3/AIS4 radio signals should be emitted in order not to disturb the satellite reception due to a multiplicity of radio signals, which can become mutually superimposed. Monitoring is then done via the AIS base stations. If the ship is located outside the communication range of an AIS base station, the emission of the AIS3/AIS4 radio signals is switched on again automatically for satellite-based monitoring at the ship.

However, the automatic switching-off function has the disadvantage that this functionality can be misused. It is thus conceivable, for example, that pirates or other terrorist organizations force the AIS ship transceiver to be switched off by means of a fake AIS base station message although the ship is not in range of an AIS base station. In the worst case, this would lead to the ship not emitting any AIS radio signals for satellite-based monitoring and the ship can thus no longer be monitored and located. However, it is also conceivable that by forging such an AIS base station message, the crew of a ship themselves switch off the AIS ship transceiver for satellite-based monitoring and thus, for example, perform illegal activities or escape access by security authorities.

SUMMARY

It is the object of the present invention, therefore, to specify an improved AIS ship transceiver which is secure with respect to manipulation attempts with regard to the automatic switching-off function.

According to the invention, the object is thereby achieved by means of the AIS ship transceiver of the type initially mentioned in that the AIS ship transceiver has a control unit which is connected to a database in which data with regard to valid AIS base stations are stored, the control unit being configured after reception of the AIS base station message, to validate the transmitting AIS base station in dependence on the data contained in the AIS base station message and the data stored in the database for this AIS base station, and for deactivating and/or activating the emission of the at least one part of the AIS radio signal in dependence on the validation of the transmitting AIS base station.

Accordingly, it is proposed according to the invention, that the AIS ship transceiver has a control unit which is connected to a database. In the database, information or data with respect to valid AIS base stations are located. Such data can be, for example, the position, the ID or other statistical data of the base stations.

If the AIS ship transceiver now receives such an AIS base station message, the transmitting AIS base station is validated in dependence on the data contained in the message and the data stored in the database for this AIS base station. Such validation can take place, for example, by means of a simple comparison of the relevant data. It is also conceivable that a plausibility check is performed for the validation, for example, in such a manner whether a base station having such an identification can be found in these waters at all.

By means of this validation of the AIS base station, it is possible to determine whether the emitted AIS base station message has been emitted by a valid AIS base station or whether this message is an attempt at misuse. Depending on the validation result, the control unit then controls the deactivation and/or activation of the emitting of the at least one part of the AIS radio signals correspondingly so that the emitting of the at least one part of the AIS radio signal is not deactivated, for example, in the case of a failed validation (attempt at misuse).

In this context, the database can be a component of the AIS ship transceiver. However, the database can also be interrogated via a remote access when the data are provided only centrally.

Thus, the AIS ship transceiver with its AIS radio receiving unit can be configured for being able to receive a base station report message (message 4) as AIS base station message which, as a rule, is emitted by an AIS base station. Such a base station report message (message 4), as a rule, contains one bit (transmission control for long range broadcast message), by means of which the activation and/or deactivation of the emission of the corresponding AIS radio signals is intended to be indicated. As a rule, such a base station report message is emitted in this case by an AIS base station in broadcast mode. If an AIS ship transceiver receives this message, it determines the bit status of the abovementioned bit and then switches the transmission of the corresponding AIS radio signals on or off in dependence on the bit status.

According to the invention it is now proposed that, in addition to the automatic switching off of the bit, the validity of the AIS base station is first validated and that deactivating and/or activating the emission of corresponding AIS radio signals is performed both by means of the bit status and by means of the validation result.

According to the invention, the AIS radio transmitting unit can be configured to emit AIS radio signals (AIS1/AIS2) of a first AIS radio signal type (TER-AIS) and AIS radio signals (AIS3/AIS4) of a second AIS radio signal type (SAT-AIS), the AIS radio receiving unit being constructed for receiving the AIS radio signals of the first AIS radio signal type. If then an AIS base station message is received, the emitting of the AIS radio signals of the second AIS radio signal type is activated and/or deactivated in dependence on the received AIS base station message and the validation of the AIS base station.

It is thus conceivable, for example, that in the case of a failed validation of the transmitting AIS base station, a deactivation or activation of the relevant AIS radio signals, indicated in the AIS base station message, is not allowed by the control unit so that the emitting of the relevant AIS radio signals is not deactivated or not activated. This makes it possible to prevent, in the case of misuse of the AIS base station message, that this is recognized and does not lead to a switching-off of the AIS ship transceiver.

However, it is also conceivable that in the case of a successful validation, the indicated deactivation and/or activation is allowed by the control unit. This makes it possible, in densely traveled regions, to prevent that the satellite monitoring does not grind to a halt due to superimposed AIS radio signals since the satellite-based monitoring is switched off and the monitoring is then performed via the corresponding base station located within range.

However, it is also conceivable that in the case of a failed validation of the transmitting AIS base station, the emitting of the respective AIS radio signals is activated independently of what is contained in the AIS base station message according to the bit status. This makes it possible to achieve, in the case of a switched-off AIS ship transceiver and in the case of finding an attempt at misuse, that the emitting of the corresponding AIS radio signals is activated in order to be able to locate and monitor the ship in this manner. In this context, it is also conceivable that a corresponding alarm message is emitted to a base station and/or to a satellite.

In a further advantageous embodiment, the control unit is configured for continuing to perform the validation of the AIS base station in dependence on the ship position of the received ship and the data contained in the message. By this means, a plausibility check can be achieved whether it is possible at all to be able to receive a corresponding base station at the ship's position.

In addition, the object is also achieved according to the invention by means of a method for transmitting and receiving AIS radio signals by an AIS ship transceiver, comprising the steps: transmitting AIS radio signals containing ship data by an AIS radio transmission unit, and receiving AIS radio signals which have been emitted by adjacent ships and/or AIS base stations, located within range, by an AIS radio receiving unit. The method is characterized by receiving an AIS base station message emitted by an AIS base station by the AIS radio receiving unit, validating the transmitting AIS base station in dependence on the data contained in the AIS base station message and on data stored in a database with respect to the transmitting AIS base station by a control unit, and deactivating and/or activating the transmitting of at least a part of the AIS radio signals in dependence on the validation of the transmitting AIS base station by the control unit.

An embodiment of the method is characterized in that a base station report message is received by the AIS radio receiving unit, a bit status (transmission control for long range broadcast message) with respect to the activation and/or deactivation of the emitting of the at least one part of the AIS radio signals in the received AIS base station report message is determined, and the transmitting of the at least one part of the AIS radio signals is deactivated and/or activated in dependence on the determined bit status by the AIS ship transceiver.

An embodiment of the method is characterized in that AIS radio signals of a first AIS radio signal type (TER-AIS), which are provided for the exchange of ship data of the ships among one another, and AIS radio signals of a second AIS radio signal type (SAT-AIS), which are provided for reception by a satellite and for transmitting the ship traffic data, contained in the AIS radio signals of the second AIS radio signal type (SAT-AIS), to a base station by means of the satellite, are emitted by the AIS radio transmission unit, the emitting of the AIS radio signals of the second AIS radio signal type (SAT-AIS) being deactivated and/or activated by the control unit after reception of the AIS base station message, in dependence on the received AIS base station message.

An embodiment of the method is characterized in that in the case of a failed validation of the transmitting AIS base station, the emitting of the at least one part of the AIS radio signals is not deactivated and/or activated by the control unit and/or in the case of a successful validation of the transmitting AIS base station, the emitting of the at least one part of the AIS radio signals is deactivated and/or activated by the control unit.

An embodiment of the method is characterized in that in the case of a failed validation of the transmitting AIS base station, the emitting of the at least one part of the AIS radio signals is activated by the control unit and/or an alarm message is emitted to a base station and/or to a satellite by the control unit.

An embodiment of the method is characterized in that the transmitting AIS base station is still validated by the control unit in dependence on the ship position of the receiving ship and the data contained in the AIS base station message.

BRIEF DESCRIPTION OF THE DRAWING

The invention will be explained in greater detail by way of example, referring to the attached FIGURE, in which:

FIG. 1 shows a diagrammatic representation of an AIS ship transceiver according to the invention.

DETAILED DESCRIPTION

FIG. 1 shows the AIS ship transceiver 1 according to the invention in a diagrammatic representation. In this context, the ship transceiver 1 is provided for installation on a ship and configured to be installed on board a ship. The ship transceiver 1 has an AIS radio transmitting unit 2 by means of which AIS radio signals can be emitted via an antenna 2a. Furthermore, the AIS ship transceiver 1 has an AIS radio receiving unit 3 which can receive corresponding AIS radio signals via an antenna 3a.

The AIS ship transceiver 1 also has a control unit 4 connected to the AIS radio transmitting unit 2 and the AIS radio receiving unit 3 in order to correspondingly deactivate or to activate the emitting of the AIS radio signals of the second AIS radio signal type. In the exemplary embodiment of FIG. 1, the control unit 4 is connected via an interface 5 of the AIS ship transceiver 1 to a positioning unit 6 which, with the aid of a GPS receiver, determines the current ship position of the ship on which the AIS ship transceiver 1 is installed and provides it to the control unit 4.

However, it is also conceivable that the functionality of positioning the ship is an integral component of the AIS ship transceiver 1.

Furthermore, the control unit 4 is connected with respect to signals to a database 7 in which data relating to valid AIS base stations are stored. These data in the database 7 can be correspondingly accessed by the control unit 4 and the data can be retrieved.

The AIS radio transmitting unit 2 is then designed in such a manner that it can emit AIS radio signals AIS1/AIS2 of the first AIS radio signal type TER-AIS (terrestrial AIS) in accordance with the AIS standard, these AIS radio signals AIS1/AIS2 containing ship data of the ship on which the AIS ship transceiver 1 is installed.

These AIS radio signals AIS1/AIS2 are emitted in broadcast mode and received by ships located within receiving range so that the adjacent ships 10 can obtain ship data of the emitting ship.

If a constructionally identical or similar AIS ship transceiver 1 is located on the adjacent ship 10, the adjacent ship in turn emits to this its ship data with the aid of AIS radio signals AIS1/AIS2 of the first AIS radio signal type TER-AIS in broadcast mode which can then be received, in turn, by the AIS ship transceiver 1 with the aid of the receiving unit 3.

According to the more recent AIS standard, the AIS radio transmitting unit 2 is also designed for emitting the AIS radio signals AIS3/AIS4 of a second AIS radio signal type SAT-AIS which can then be received by a satellite 11. According to the AIS standard, the radio signals of the second AIS radio signal type SAT-AIS are exclusively used for establishing a satellite-based monitoring system especially on the high sea in order thus to monitor the ship traffic in a gapless manner.

Furthermore, the AIS radio receiving unit 3 is designed for receiving radio signals of an AIS base station 12 by means of which the AIS ship transceiver can determine that it is located within an area of reception of an AIS base station when it has received, for example, an AIS base station message (message 4) emitted in broadcast mode. In this case, the AIS ship transceiver 1 is designed for deactivating the emitting of the AIS radio signals AIS3/AIS4 of the second AIS radio signal type since the AIS radio signals of the first AIS radio signal type can be received and used for monitoring the ship traffic in the communication range of the AIS base station 12. In order to avoid signal collisions in the area of reception of the satellite communication, this communication path is at times deactivated as provided in the AIS standard.

For this purpose, the base station 12 emits a corresponding AIS base station message (message 4) in which a corresponding bit is set which indicates the deactivation of the emission of the AIS radio signals AIS3/AIS4 of the second AIS radio signal type.

In order then to prevent misuse of this automatic deactivation function, the control unit 4 is configured in such a manner that it validates the AIS base station 12 in dependence on the data stored in the database 7 and the data contained in message 4 in order to establish whether this is a valid base station and the satellite-based monitoring communication channel can thus be switched off. If, in contrast, this is not a valid base station, the emission of the AIS radio signals AIS3/AIS4 remains unchanged.

The invention claimed is:

1. An Automatic Identification System (AIS) ship transceiver which is provided for installation in a ship in order to be able to transmit and receive AIS radio signals, comprising
    an AIS radio transmitting unit which is configured for transmitting AIS radio signals of a first AIS radio signal type which is terrestrial AIS (TER-AIS), which are provided for the exchange of ship data of adjacement ships among one another, and for transmitting AIS radio signals of a second AIS radio signal type which is satellite AIS (SAT-AIS), which are provided for reception by a satellite and for transmitting ship traffic data to a base station by means of the satellite;
    an AIS radio receiving unit which is configured for receiving AIS radio signals which are emitted by adjacent ships and/or AIS base stations located within range; and
    a control unit which is connected to a database in which data with respect to valid AIS base stations are stored, the control unit being configured
        to validate a transmitting AIS base station after reception of an AIS base station message in dependence on data contained in the AIS base station message and the data stored in the database for the transmitting AIS base station, and
        for deactivating and/or activating the emission of at least a part of the AIS radio signals in dependence on the validation of the transmitting AIS base station,
    wherein the AIS ship transceiver is configured to deactivate and/or to activate the emitting of the AIS radio signals of the second AIS radio signal type by the AIS radio transmitting unit after reception of the AIS base station message, in dependence on the received AIS base station message.

2. The AIS ship transceiver according to claim 1, wherein the AIS radio receiving unit is further configured for receiving a base station report message as an AIS base station message, and wherein the AIS ship transceiver is further configured
    for determining a bit status (transmission control for long range broadcast message) with respect to the activation and/or deactivation of the emitting of the AIS radio signals of the second AIS radio signal type in the received base station report message and
    for deactivating and/or activating the emitting of the AIS radio signals of the second AIS radio signal type in dependence on the bit status determined.

3. The AIS ship transceiver according to claim 1, wherein the control unit is further configured
    not to deactivate and/or activate the emitting of the AIS radio signals of the second AIS radio signal type in the case of a failed validation of the transmitting AIS base station, and/or
    to deactivate and/or to activate the emitting of the AIS radio signals of the second AIS radio signal type in the case of a successful validation of the transmitting AIS base station.

4. The AIS ship transceiver according to claim 1, wherein the control unit is further configured to activate the emitting of the AIS radio signals of the second AIS radio signal type in the case of a failed validation of the transmitting AIS base station and/or to emit an alarm message to a base station and/or to a satellite.

5. The AIS ship transceiver according to claim 1, wherein the control unit is further configured to continue to validate the transmitting AIS base station in dependence on a ship position of the ship and the data contained in the received AIS base station message.

6. A method for transmitting and receiving (Automatic Identification System) AIS radio signals by an AIS ship transceiver, comprising the steps:
    transmitting AIS radio signals containing ship data by an AIS radio transmission unit, the AIS radio signals that are transmitted including AIS radio signals of a first AIS radio signal type which is terrestrial AIS (TER-AIS), which are provided for the exchange of ship data of adjacent ships among one another, and AIS radio signals of a second AIS radio signal type which is satellite AIS (SAT-AIS), which are provided for reception by a satellite and for transmitting ship traffic data to a base station by means of the satellite,
    receiving, by an AIS radio receiving unit, AIS radio signals which have been emitted by adjacent ships and/or AIS base stations located within range wherein the step of receiving includes receiving an AIS base station message emitted by an AIS base station,
    validating, by a control unit, the transmitting AIS base station in dependence on data contained in the AIS base station message and on data with respect to the transmitting AIS base station stored in a database, and
    deactivating and/or activating, by the control unit, the transmitting of AIS radio signals of the second AIS radio signal type after reception of the AIS base station message in dependence on the validation of the transmitting AIS base station.

7. The method according to claim 6, further comprising
    receiving, by the AIS radio receiving unit, a base station report message, and
    determining a bit status (transmission control for long range broadcast message) with respect to the activation and/or deactivation of the emitting of the AIS radio signals of the second AIS radio signal type in the received AIS base station report message, and
    wherein the deactivation and/or activation of the transmitting of the AIS radio signals of the second AIS radio signal type is performed in further dependence on the determined bit status.

8. The method according to claim 6, wherein
    in the case of a failed validation of the transmitting AIS base station, the emitting of the AIS radio signals of the second AIS radio signal type is not deactivated and/or activated by the control unit and/or in the case of a successful validation of the transmitting AIS base station, the emitting of the AIS radio signals of the second AIS radio signal type is deactivated and/or activated by the control unit.

9. The method according to claim 6, wherein in the case of a failed validation of the transmitting AIS base station, the emitting of the AIS radio signals of the second AIS radio signal type is activated by the control unit and/or an alarm message is emitted to a base station and/or to a satellite by the control unit.

10. The method according to claim 6, wherein the transmitting AIS base station is continually validated by the control unit in dependence on a ship position of the ship and on the data contained in the AIS base station message.

* * * * *